(12) United States Patent
Sakai et al.

(10) Patent No.: US 11,086,011 B2
(45) Date of Patent: Aug. 10, 2021

(54) TARGET DETECTION DEVICE

(71) Applicants: DENSO CORPORATION, Kariya (JP); TOYOTA JIDOSHA KABUSHIKI KAISHA, Toyota (JP)

(72) Inventors: Tadashi Sakai, Kariya (JP); Yohei Masui, Kariya (JP); Ryoma Niihara, Kariya (JP); Takashi Maeda, Toyota (JP); Takeshi Nanami, Toyota (JP); Minoru Nakadori, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 16/303,383

(22) PCT Filed: May 19, 2017

(86) PCT No.: PCT/JP2017/018841
§ 371 (c)(1),
(2) Date: Nov. 20, 2018

(87) PCT Pub. No.: WO2017/204107
PCT Pub. Date: Nov. 30, 2017

(65) Prior Publication Data
US 2019/0293787 A1    Sep. 26, 2019

(30) Foreign Application Priority Data
May 24, 2016    (JP) .............................. JP2016-103673

(51) Int. Cl.
*G01S 13/931*    (2020.01)
*B60R 21/00*    (2006.01)
(Continued)

(52) U.S. Cl.
CPC ............ *G01S 13/931* (2013.01); *B60R 21/00* (2013.01); *G01S 13/50* (2013.01); *G01S 13/86* (2013.01);
(Continued)

(58) Field of Classification Search
CPC ........ G01S 13/931; G01S 13/93; G01S 13/50; G01S 13/86; G01S 2013/9318;
(Continued)

(56) References Cited

U.S. PATENT DOCUMENTS 9,390,624 B2 *   7/2016 Minemura ............ G01S 13/867
10,775,497 B2 *  9/2020 Takaki ................ B60W 30/085
(Continued)

FOREIGN PATENT DOCUMENTS

JP    2008-276689 A    11/2008
JP    2011-053139 A    3/2011
(Continued)

OTHER PUBLICATIONS

English translation of Written Opinion on PCT/JP2017/018841, dated Aug. 22, 2017 (Year: 2017).*

*Primary Examiner* — Frank J McGue
(74) *Attorney, Agent, or Firm* — Maschoff Brennan

(57) ABSTRACT

A target detection device mounted in a vehicle includes: a radar specification unit; a same target determination unit; and an image specification unit that specifies, as image target position information, an image detection region of an image detection target detected on the basis of a captured image, the image detection region representing the position of the image detection target relative to the base point on an XY-plane with the X-axis representing the vehicle width direction of the vehicle and the Y-axis representing the vehicle length direction of the vehicle. The image specification unit sets the Y-axis range of the image detection (Continued)

region in the Y-axis direction on the basis of the bearing from the base point to each of the two X-directional ends of the image detection target in the captured image and of an expected width minimum value and an expected width maximum value in the X-axis direction.

12 Claims, 2 Drawing Sheets

(51) Int. Cl.
| | | |
|---|---|---|
| *G01S 13/50* | (2006.01) | |
| *G01S 13/86* | (2006.01) | |
| *G08G 1/16* | (2006.01) | |
| *G01V 11/00* | (2006.01) | |
| *G01S 13/93* | (2020.01) | |

(52) U.S. Cl.
CPC .............. *G01S 13/93* (2013.01); *G01V 11/00* (2013.01); *G08G 1/16* (2013.01); *G01S 2013/9318* (2020.01); *G01S 2013/9319* (2020.01); *G01S 2013/93185* (2020.01)

(58) Field of Classification Search
CPC .. G01S 2013/9319; G01S 2013/93185; G01V 11/00; B60R 21/00; G08G 1/16
USPC .......................................................... 342/71
See application file for complete search history.

(56) References Cited

U.S. PATENT DOCUMENTS

| | | | | |
|---|---|---|---|---|
| 10,787,170 | B2* | 9/2020 | Minemura | ........ B60W 50/0097 |
| 2014/0139369 | A1* | 5/2014 | Baba | ........................ G01S 13/50 |
| | | | | 342/146 |
| 2015/0054673 | A1* | 2/2015 | Baba | ..................... G01S 13/867 |
| | | | | 342/27 |
| 2020/0319334 | A1* | 10/2020 | Zhan | ......................... G01S 7/40 |

FOREIGN PATENT DOCUMENTS

| | | |
|---|---|---|
| JP | 2012-088285 A | 5/2012 |
| JP | 2015-041265 A | 3/2015 |
| JP | 2015-206797 A | 11/2015 |

* cited by examiner

TARGET DETECTION DEVICE

CROSS-REFERENCE TO RELATED APPLICATION

The present application is a national stage application under 35 U.S.C. § 371(c) of PCT Application No. PCT/JP2017/018841, filed on May 19, 2017, which is based on Japanese Patent Application No. 2016-103673 filed on May 24, 2016, the entire contents of which are incorporated herein by reference.

TECHNICAL FIELD

The present disclosure relates to a target detection device that detects a target.

BACKGROUND ART

Collision avoidance systems for vehicles are required to accurately detect targets such as other vehicles and pedestrians. In this regard, a configuration for detecting targets with a radar and an image sensor has been proposed. Specifically, targets are detected by the radar and the image sensor independently, and if the positional relation between these targets satisfies a determination criterion, it is determined that these targets are the same target (hereinafter referred to as fusion determination).

The following method is an example of detecting the position of a target by the image sensor on an XY-plane constructed with the X-axis representing the vehicle width direction of the host vehicle and the Y-axis representing the vehicle length direction of the host vehicle. The Y-coordinate on the XY-plane is specified on the basis of the vertical position of the target in a captured image acquired by the image sensor, and the horizontal bearing position of the target is specified on the basis of the left-right position of the target in the captured image. The lower end position of the target in the captured image tends to become higher as the position of the target becomes farther from the host vehicle in the front direction (as the Y-coordinate increases). Therefore, the Y-coordinate can be specified on the basis of the height of the lower end position of the target in the captured image. However, such a specification method has the following feature: the accuracy of detecting the Y-coordinate is reduced if the lower end position of the target is not accurately detected. Thus, fusion determination could produce an incorrect result such as recognition of a single target as different targets.

In order to overcome this problem, PTL 1 constructs an XY-coordinate error region around the detection point of a target detected on the basis of a captured image acquired by an image sensor. In this case, since the accuracy of detecting the Y-coordinate of the detection point of the target is reduced as the Y-coordinate increases, the error region is set such that its Y-directional width increases as the Y-coordinate of the detection point of the target increases.

CITATION LIST

Patent Literature

[PTL 1] JP 2015-206797 A

SUMMARY OF THE INVENTION

PTL 1 detects the Y-coordinate of the target by detecting the height of the lower end position of the target in the captured image, and does not resolve the concern that the accuracy of detecting the Y-coordinate is reduced as the distance to the target increases. Therefore, in order to prevent a single target from being incorrectly recognized as different targets in fusion determination, an excessively large error region is required.

The present disclosure has been made in order to solve the above problems, and the main object thereof is to provide a target detection device capable of appropriately setting the Y-axis range of an image detection region including the Y-coordinate of the position of a target to be detected by an image sensor.

The present disclosure is a target detection device mounted in a vehicle, the target detection device including: a radar specification unit that specifies, as radar target position information, a radar detection point or a radar detection region of a radar detection target detected on the basis of detection information provided by a radar, the radar detection point being a detection point representing a position of the radar detection target relative to a base point of the vehicle on an XY-plane with an X-axis representing a vehicle width direction of the vehicle and a Y-axis representing a vehicle length direction of the vehicle, the radar detection region including the radar detection point; an image specification unit that specifies, as image target position information, an image detection region of an image detection target detected on the basis of a captured image provided by an imaging device, the image detection region being a region representing a position of the image detection target relative to the base point on the XY-plane; and a same target determination unit that determines that the radar detection target and the image detection target are the same target on condition that there is an overlapping part on the XY-plane between the position indicated by the radar target position information and the position indicated by the image target position information, and the image specification unit sets a Y-axis range as a Y-directional range of the image detection region on the XY-plane on the basis of a bearing from the base point to each of two X-directional ends of the image detection target in the captured image and of an expected width minimum value and an expected width maximum value as a minimum value and a maximum value of an X-directional width of an object expected to be detected as the target.

Since the X-directional width of a captured image detection target increases as the distance from the imaging device to the target decreases, the Y-coordinate of the target can be calculated on the basis of the X-directional width. The X-directional width of an image detection target is correlated with the bearing from the base point to each of the two X-directional ends of the image detection target in the captured image and with the Y-coordinate of the target. Here, the X-directional width of a captured image detection target increases as the actual X-directional width of the target increases. Therefore, when the X-directional width of an image detection target is different from the actual X-directional width of the target, the Y-coordinate of the image detection target to be calculated is changed. Thus, if the Y-coordinate of the target is calculated using the expected width minimum value, the calculated Y-coordinate has the smallest value. If the Y-coordinate of the target is calculated using the expected width maximum value, the calculated Y-coordinate has the largest value. Therefore, the Y-axis range of the image detection region can be set on the basis of the minimum value of the Y-coordinate and the maximum value of the Y-coordinate. Consequently, the Y-axis range of the image detection region including the Y-coordinate can be appropriately set, and the accuracy of same target determination can be ensured.

BRIEF DESCRIPTION OF DRAWINGS

The above and other objects, characteristics, and advantages of the present disclosure will be further clarified in the following detailed description with reference to the accompanying drawings, in which.

DESCRIPTION OF EMBODIMENTS

Figure 1:
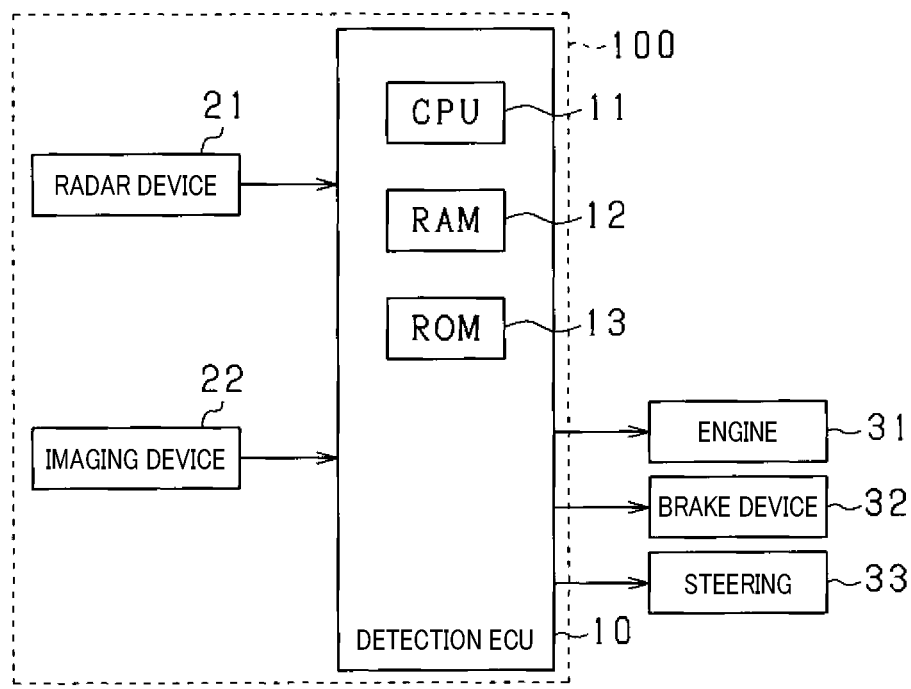
FIG. 1 is a schematic configuration diagram of a traveling assist device according to the present embodiment.

A traveling assist device 100 illustrated in FIG. 1 is mounted in a vehicle (host vehicle) to sense a target located around the host vehicle, such as ahead of the host vehicle in its traveling direction, and perform traveling assist control. The traveling assist control provides a function of adaptive cruise control (ACC) for performing control such that the distance to the detected front vehicle has an inter-vehicle distance target value that depends on the speed of the vehicle.

In FIG. 1, the traveling assist device 100 includes a detection ECU 10, a radar device 21, and an imaging device 22.

The radar device 21 is, for example, a well-known millimeter-wave radar that transmits high-frequency signals in a millimeter waveband, and is provided at the front end of the host vehicle so as to detect the position of a target (referred to as a radar detection target) within a sensing range, i.e., a region within a predetermined sensing angle in which targets can be sensed. Specifically, the radar device 21 transmits probe waves at predetermined intervals, and receives reflected waves through a plurality of antennas. The distance to the radar detection target is calculated using the time at which a probe wave is transmitted and the time at which a reflected wave is received. The radar device 21 also calculates relative speed using the Doppler-shifted frequency of the reflected wave reflected by the radar detection target. In addition, the radar device 21 calculates the bearing to the radar detection target using the phase difference between the reflected waves received by the plurality of antennas. If the position of and bearing to the radar detection target can be calculated, the position of the radar detection target relative to the host vehicle can be specified. The radar device 21 transmits probe waves, receives reflected waves, calculates reflection positions and relative velocities, and transmits the calculated reflection positions and relative velocities to the detection ECU 10 at predetermined intervals.

The present embodiment is based on the assumption that the imaging device 22 is a monocular camera. In this case, the imaging device 22 is attached to the host vehicle at a predetermined height in the width-directional center thereof to capture, from a high perspective, a region extending over a predetermined range of angles in front of the host vehicle. The imaging device 22 then transmits captured image information to the detection ECU 10. Note that the imaging device 22 may be a stereo camera, a CCD camera, or the like.

The radar device 21 and the imaging device 22 are coupled to the detection ECU 10. The detection ECU 10 is a computer including a CPU 11, RAM 12, ROM 13, I/O interface, and the like. The CPU 11 executes a program installed on the ROM 13, whereby the detection ECU 10 implements various functions thereof. The detection ECU 10 corresponds to a radar specification unit, an image specification unit, a same target determination unit, and an identification unit.

In the present embodiment, a plurality of programs is installed on the ROM 13. Specifically, a pattern matching program, a determination program, and a target-following control program are installed on the ROM 13.

The pattern matching program detects luminance in image information transmitted from the imaging device 22, and performs pattern matching with a predefined target template on the basis of the detected luminance. Specifically, the target template is moved in the vertical and horizontal directions on the image by a minute amount in predetermined order, and pattern matching is performed at each position. Pattern matching at each position refers to a determination process including calculating the degree of coincidence between the luminance of the image at that position and the luminance of the target template and determining whether the calculated degree of coincidence is greater than a reference value. In the determination process, if it is determined that the degree of coincidence between the luminance in the image at that position and the luminance of the target template is greater than the reference value, an object similar to the target template is considered to be located at the part having luminance information matched with that of the target template, and thus the object located at this part is detected as an image detection target. In addition, the type of the detected image detection target is specified from the matched target template. In the present embodiment, types are roughly classified as motorcycles, passenger cars (small-size vehicles and medium-size vehicles), and trucks (large-size vehicles).

The determination program determines, on the basis of information on a radar detection target and information on an image detection target, whether these targets indicate the same target (hereinafter referred to as same target determination). This is described in more detail later.

The target-following control program transmits a control command to an engine 31 and a brake device 32 in order to keep, at a target value, the distance from the host vehicle to the target traveling ahead of the host vehicle in its lane (hereinafter referred to as a present lane). Such a target (hereinafter referred to as a present lane front target) is selected from among same targets detected by the determination program. The target value is a variable that depends on the traveling speed of the host vehicle.

At this time, the driver may change lanes by operating a steering 33. In this case, a control command is transmitted to the engine 31 and the brake device 32 such that the distance from the host vehicle to a new following target is kept at the target value as in the case of automatic steering. More specifically, the front target traveling on the destination lane adjacent to the present lane is set as the present lane front target as the host vehicle changes lanes, and target-following control is performed such that the host vehicle follows the present lane front target.

If no front target is traveling in the present lane, the target-following control program controls the traveling speed on the basis of, for example, the traveling speed set by the driver or the speed limit on the road where the host vehicle is traveling.

Figure 2:
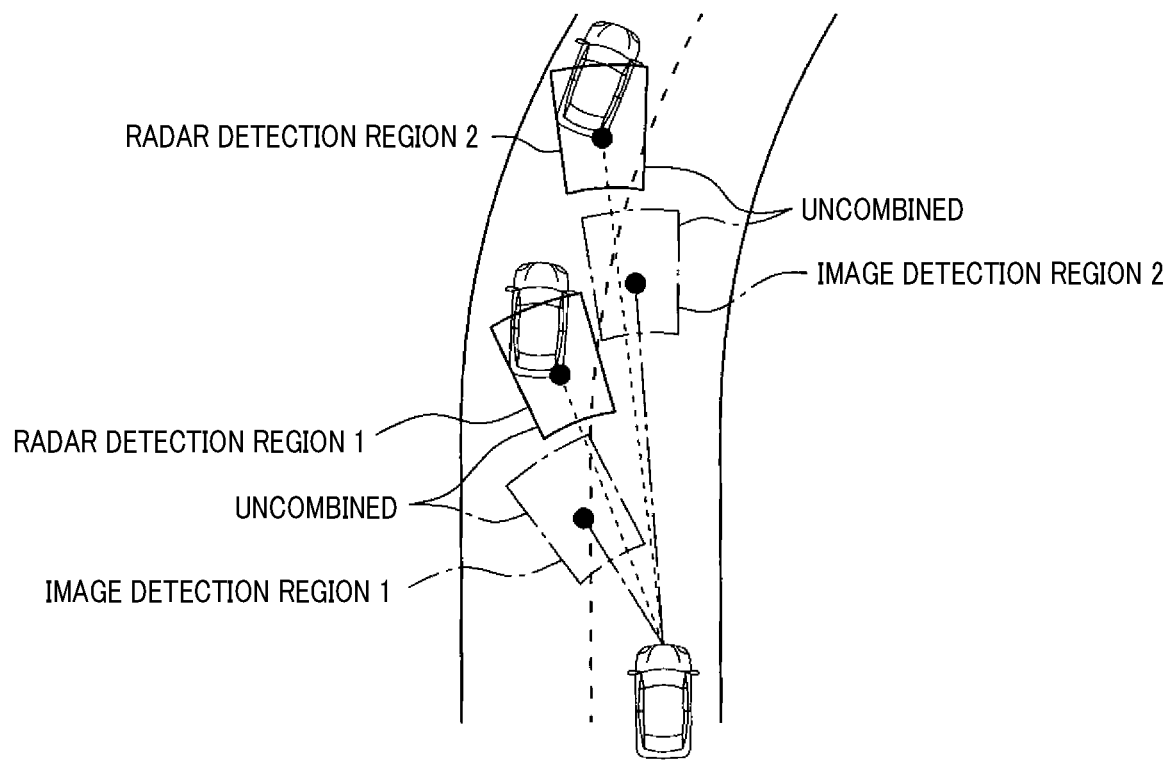
FIG. 2 is a diagram schematically illustrating a problem of concern in conventional same target determination.

When performing same target determination, a conventional determination program constructs an XY-plane with the X-axis representing the vehicle width direction of the host vehicle and the Y-axis representing the vehicle length direction of the host vehicle, and constructs an XY-coordinate error region around the detection point of a detected image detection target. The Y-coordinate of the detection point of the image detection target is specified on the basis of the height of the lower end position of the image detection target. This is because the lower end position of the image detection target in the captured image tends to become higher as the position of the target becomes farther from the host vehicle in the front direction. However, such a specification method has the following feature: the accuracy of detecting the Y-coordinate is reduced if the lower end position of the image detection target is not accurately detected. Therefore, constructing an XY-coordinate error region around the detection point of the image detection target to perform fusion determination could produce an incorrect result such as recognition of a single target as different targets (uncombined determination) as illustrated in FIG. 2.

Figure 3:
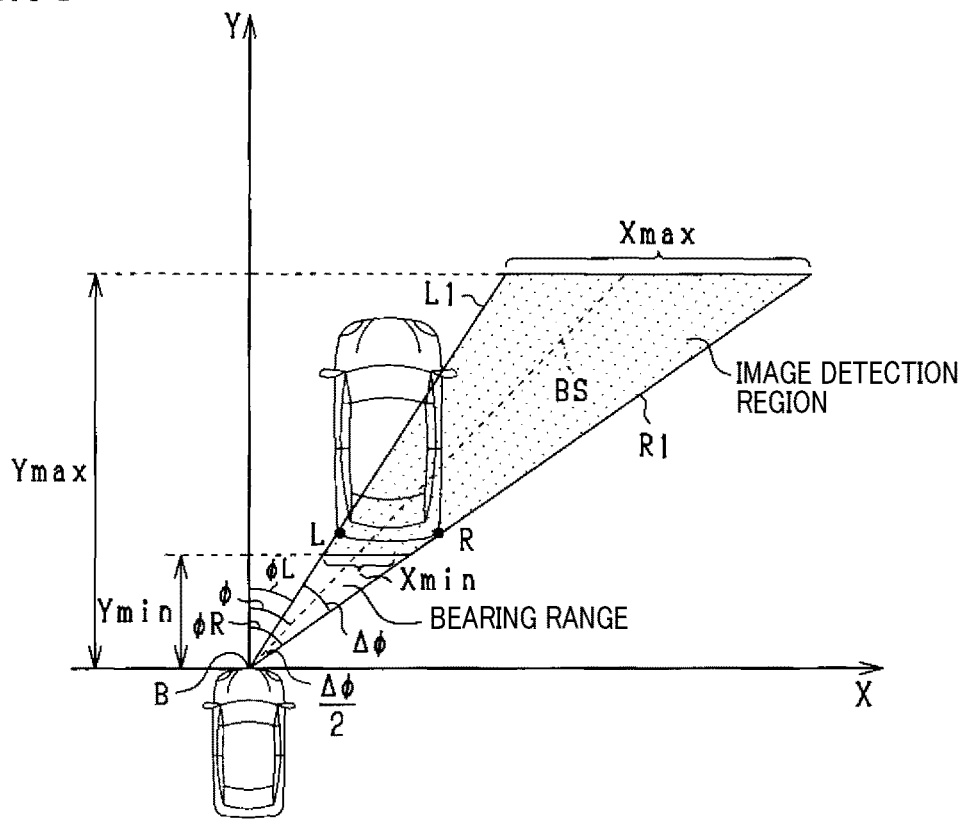
FIG. 3 is a diagram illustrating a method of constructing an image detection region according to the present embodiment.

Thus, as illustrated in FIG. 3, the determination program according to the present embodiment does not detect the lower end position of an image detection target, but sets the position of the imaging device 22 in the vehicle as the origin B to construct an XY-plane with the X-axis representing the vehicle width direction of the host vehicle and the Y-axis representing the vehicle length direction of the host vehicle. On the constructed XY-plane, an image detection region is constructed as a region expected to contain an image detection target on the basis of the bearings from the origin B to the two X-directional ends of the image detection target.

Since the X-directional width of a captured image detection target increases as the distance from the imaging device 22 to the target decreases, the Y-coordinate of the target can be calculated on the basis of the X-directional width. The X-directional width of an image detection target is correlated with the bearing from the base point to each of the two X-directional ends of the image detection target in the captured image and with the Y-coordinate of the target. Here, the X-directional width of a captured image detection target increases as the actual X-directional width of the target increases. Therefore, when the X-directional width of an image detection target is different from the actual X-directional width of the target, the Y-coordinate of the image detection target to be calculated is changed. For example, if the Y-coordinate is calculated on the assumption that the X-directional width of an image detection target is larger than the actual vehicle width of the target, the position at which the target is actually located can be closer to the host vehicle than the position of the image detection target is.

Therefore, assuming that the actual X-directional width of a target is the minimum value (hereinafter referred to as an expected width minimum value Xmin) of the X-directional width of an object expected to be the target, the smallest Y-coordinate of all possible positions of the target is calculated. At this time, the calculated Y-coordinate is referred to as a Y-axis minimum value Ymin. In addition, assuming that the actual X-directional width of a target is the maximum value (hereinafter referred to as an expected width maximum value Xmax) of the X-directional width of an object expected to be the target, the largest Y-coordinate of all possible positions of the target is calculated. At this time, the calculated Y-coordinate is referred to as a Y-axis maximum value Ymax. Therefore, the Y-directional range (hereinafter referred to as a Y-axis range) of the image detection region is set from the Y-axis minimum value Ymin to the Y-axis maximum value Ymax.

Specifically, as illustrated in FIG. 3, a bearing range is constructed on the basis of the bearings to the X-directional left end (hereinafter referred to as a target left end L) and right end (hereinafter referred to as a target right end R) of the image detection target with respect to the traveling direction of the host vehicle. This bearing range is constructed by converting the bearing to the target left end L and the bearing to the target right end R in the captured image into a bird's-eye view and projecting it into the XY-plane. In FIG. 3, the vehicle corresponding to the target is virtually illustrated for the sake of explanation. Then, the Y-axis minimum value Ymin and the Y-axis maximum value Ymax are calculated at which the X-directional width of the constructed bearing range coincides with the expected width minimum value Xmin and the expected width maximum value Xmax, respectively. As illustrated by the hatched area, the Y-directional range (hereinafter referred to as a Y-axis range) of the bearing range defined by the calculated Y-axis minimum value Ymin and Y-axis maximum value Ymax is set as the image detection region.

In the present embodiment, the expected width minimum value Xmin is set to the minimum X-directional width of the rear ends of commercially supplied vehicles or motorcycles. More specifically, if the type of detected image detection target is identified as a motorcycle, a passenger car, or a truck, the expected width minimum value Xmin is set to 0.5 m, 1.4 m, or 1.7 m, respectively. The expected width maximum value Xmax is set to the maximum X-directional width of the rear ends of commercially supplied vehicles or motorcycles. More specifically, if the type of detected image detection target is identified as a motorcycle, a passenger car, or a truck, the expected width maximum value Xmax is set to 1.2 m, 2.0 m, or 2.6 m, respectively.

The Y-axis minimum value Ymin at which the X-directional width of the bearing range coincides with the expected width minimum value Xmin can be calculated using Formula (2). Below is a detailed method of calculation.

On the XY-plane, a virtual line R1 passing through the target right end R and the origin B is drawn, and the angle $\varphi R$ formed by the virtual line R1 and the Y-axis is detected. On the constructed XY-plane, a virtual line L1 passing through the target left end L and the origin B is drawn, and the angle $\varphi L$ formed by the virtual line L1 and the Y-axis is detected. The tangent value of the angle $\varphi R$ is obtained by dividing the X-coordinate of the target right end R by the Y-coordinate (corresponding to the Y-axis minimum value Ymin) of the target right end R. In other words, the Y-axis minimum value Ymin is obtained by dividing the X-coordinate of the target right end R by the tangent value of the angle $\varphi R$. In addition, the X-coordinate of the target right end R corresponds to the value obtained by adding the expected width minimum value Xmin and the X-coordinate of the target left end L. The X-coordinate of the target left end L corresponds to the product of the Y-coordinate (corresponding to the Y-axis minimum value Ymin) of the target left end L and the tangent value of the angle $\varphi L$. In consideration of the above, the expressions related to the Y-axis minimum value Ymin are simplified into Formula (1).

$$Y\min = X\min/(\tan \varphi R - \tan \varphi L) \tag{1}$$

In the present embodiment, the bearing range is constructed on the basis of the bearings from the origin B to the target left end L and the target right end R on the XY-plane, and the image detection region is set in the bearing range. Therefore, the Y-axis minimum value Ymin is obtained on the basis of the angular width Δφ of the bearing range with respect to the origin B.

The difference obtained by subtracting the angle φL from the detected angle φR corresponds to the angular width Δφ formed by the virtual line R1 and the virtual line L1 with respect to the origin B. A bisector BS of the angular width Δφ is drawn, and the angular width Δφ/2 formed by either the virtual line R1 or the virtual line L1 that defines the bearing range and by the bisector BS is calculated. Then, the angle obtained by adding the calculated angular width Δφ/2 to the angle φL is calculated as the angle φ.

Note that the angle φR is obtained by adding the angular width Δφ/2 to the angle φ, and the angle φL corresponds to the value obtained by subtracting the angular width Δφ/2 from the angle φ. Therefore, Formula (1) can be transformed into Formula (2), and the Y-axis minimum value Ymin can be calculated on the basis of Formula (2).

$$Y\min = X\min/\{(\tan(\varphi+\Delta\varphi/2)-\tan(\varphi-\Delta\varphi/2)\} \quad (2)$$

Similarly, the Y-axis maximum value Ymax at which the X-directional width of the bearing range coincides with the expected width maximum value Xmax can be calculated using Formula (3).

$$Y\max = X\max/\{(\tan(\varphi+\Delta\varphi/2)-\tan(\varphi-\Delta\varphi/2)\} \quad (3)$$

Figure 4:
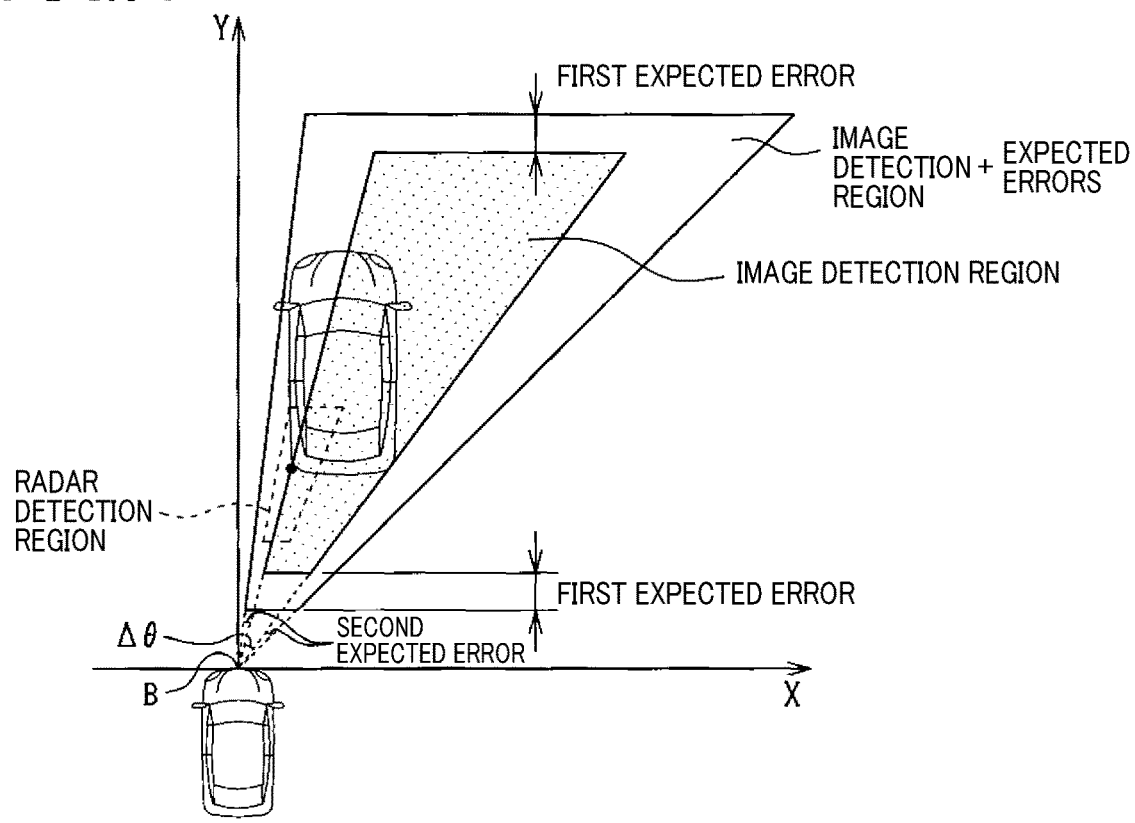
FIG. 4 is a diagram illustrating a method of expanding an image detection region according to the present embodiment.

Then, the Y-directional range (hereinafter referred to as a Y-axis range) is stored in the constructed bearing range, and the Y-axis range of the bearing range defined by the Y-axis minimum value Ymin and the Y-axis maximum value Ymax is set as the image detection region. However, if an error occurs during the detection of the two X-directional ends of the image detection target, an error could also occur in the angular width Δφ, and this detection error could cause further errors in the X-directional range (hereinafter referred to as an X-axis range) and Y-axis range of the image detection region. Therefore, as illustrated in FIG. 4, the Y-axis range of the image detection region is expanded in both directions by a first expected error, and the angular width Δφ is also expanded in both directions by a second expected error, whereby the X-axis range of the image detection region is expanded. The first expected error and the second expected error are set as expected margins of error that are based on the characteristics of the imaging device 22.

Meanwhile, the width corresponding to the expected margin of error that is based on the characteristics of the radar device 21 is added in the Y-axis direction around a radar detection target position, i.e., the position obtained from a radar detection target. Then, the angular width corresponding to the expected margin of error that is based on the characteristics of the radar device 21 is added in both directions to the bearing angle from the base point to the radar detection target position. The resulting defined region is set as a radar detection region.

The determination program determines that the radar detection target and the image detection target are the same target on condition that there is an overlapping region between the set radar detection region and image detection region.

With the above configuration, the present embodiment achieves the following effects.

The Y-axis range of the image detection region is set from the Y-axis minimum value Ymin to the Y-axis maximum value Ymax calculated on the basis of Formula (1) and Formula (2). Consequently, the Y-axis range of the image detection region including the Y-coordinate at which the target is actually located can be appropriately set in accordance with information on the distance to the image detection target, and the accuracy of same target determination can be ensured.

The expected width maximum value Xmax and the expected width minimum value Xmin are expected to vary in accordance with the type of target. Therefore, the expected width maximum value Xmax and the expected width minimum value Xmin are changed in accordance with the type of target. Accordingly, the Y-axis range of the image detection region is changed, and unnecessary expansion of the image detection region can be prevented. Furthermore, uncombined determination can be prevented, that is, different targets can be prevented from being recognized as the same target due to the presence of an overlapping part between radar target position information and image target position information.

The Y-axis range of the image detection region is expanded in both directions by the first expected error, whereby the image detection region including the Y-axis range supposed to be set can be set even when an error occurs during the detection of the two X-directional ends of the image detection target. That is, the image detection region including the correct Y-axis range can be set. As a result, the accuracy of same target determination can be maintained.

The angular width Δφ of the bearing range in which the image detection region is constructed is expanded in both directions by the second expected error, whereby the image detection region is expanded. Consequently, the image detection region including the angular width Δφ supposed to be set can be set even when an error occurs during the detection of the two X-directional ends of the image detection target. That is, the image detection region including the correct angular width Δφ can be set.

The expected width maximum value Xmax and the expected width minimum value Xmin are set on the basis of the X-directional widths of commercially supplied vehicles or motorcycles. Consequently, the Y-axis range of the image detection region can be set so as to cover all targets that travel on public roads.

The above embodiment can be changed and implemented in the following manner.

In the above embodiment, the present control is applied to the traveling assist device 100 providing the function of ACC. In this regard, the present control may be applied to the traveling assist device 100 providing a pre-crash safety system (PCS) function for performing control to avoid a collision with a target or reduce damage from a collision.

In the above embodiment, the type of detected image detection target is specified from the matched target template. In this regard, the type of image detection target need not necessarily be specified. In this case, the expected width maximum value Xmax and the expected width minimum value Xmin are set in consideration of all targets (including motorcycles, small-size vehicles, medium-size vehicles, and large-size vehicles) expected to be detected.

In the above embodiment, detected image detection targets are roughly classified by type as motorcycles, passenger cars, and trucks. In this regard, the way to roughly classify detected image detection targets is not limited, and detected image detection targets may be roughly classified as small-size vehicles, medium-size vehicles, and large-size vehicles.

In the above embodiment, the position of the imaging device 22 in the vehicle is set as the origin B, and the XY-plane is constructed with the X-axis representing the vehicle width direction of the host vehicle and the Y-axis representing the vehicle length direction of the host vehicle. In this regard, the origin B need not be the position of the imaging device 22 in the vehicle, but may be the position of the radar device 21 in the vehicle, for example, and the XY-plane may be similarly constructed with the X-axis representing the vehicle width direction of the host vehicle and the Y-axis representing the vehicle length direction of the host vehicle.

In the above embodiment, the image detection region is constructed in the bearing range determined on the basis of the bearings to the two ends of the image detection target. In this regard, if the Y-axis range of the image detection region is determined on the basis of the X-directional width of the bearing range, the configuration of setting the X-axis range of the image detection region is optional. In other words, the X-axis range of the image detection region may be set outside the bearing range or inside the bearing range.

In the above embodiment, the image detection region is constructed in the bearing range determined on the basis of the bearings to the two ends of the image detection target. In this regard, if the X-axis range of the image detection region is determined in the bearing range, the configuration of setting the Y-axis range of the image detection region is optional. In other words, the Y-axis range of the image detection region may be set outside the bearing range or inside the bearing range. In this alternative example, when setting the X-axis range of the image detection region, the angular width $\Delta\varphi$ of the bearing range is expanded in both directions by the second expected error, whereby the X-axis range of the image detection region is expanded.

In the above embodiment, the Y-directional range of the image detection region is expanded in both directions by the first expected error, and the angular width $\Delta\varphi$ is expanded in both directions by the second expected error, whereby the X-axis range of the image detection region is expanded. In this regard, the Y-axis range and X-axis range of the image detection region need not necessarily be expanded, but either the Y-axis range or the X-axis range may be expanded, or the image detection region may not be expanded.

In the above embodiment, if the degree of coincidence between the luminance in the image and the luminance of the target template is greater than the reference value, it is determined that the target is located at the position in the image having that luminance. In this regard, suppose the detection reliability of the image detection target is low. The detection reliability of the image detection target is considered low, for example, if the degree of coincidence between the luminance in the image and the luminance of the target template only slightly exceeds the reference value, which means that the detection reliability is relatively low. Alternatively, the detection reliability of the image detection target is considered low if the image detection target becomes undetectable several times during the period of detecting the image detection target (if the image detection target is not detected continuously but is detected intermittently), or if the degree of variation in position information of the image detection target detected through pattern matching is greater than a threshold value.

In such a case, an incorrect type of image detection target could be specified from the matched target template. Therefore, in the above situations, at least one of the first expected error and the second expected error is corrected to a large extent so that the image detection region is expanded more greatly. Consequently, the accuracy of same target determination can be ensured even when the reliability of information about the image detection target is low.

Similarly, the control according to this alternative example may be performed when the detection reliability of the radar detection target is low. Specifically, if the detection reliability of the radar detection target is low because the degree of variation in position information of the radar detection target is greater than a threshold value, for example, at least one of the first expected error and the second expected error is corrected to a large extent so that the image detection region is expanded more greatly. Consequently, the accuracy of same target determination can be ensured even when the detection reliability of the radar detection target is low.

In the above embodiment, the Y-directional range of the image detection region is expanded in both directions by the first expected error, and the angular width $\Delta\varphi$ is expanded in both directions by the second expected error, whereby the X-axis range of the image detection region is expanded. At this time, suppose the host vehicle turns and causes a significant change in image information acquired by the imaging device 22. In this case, since a large error could occur in position information of the image detection target, the process of filtering position information of the image detection target acquired during this period is performed. However, the filtered position information of the image detection target is still expected to include a larger error than position information acquired while the host vehicle is not turning. Therefore, in order to deal with the above situation where a large error occurs in position information of the image detection target, at least one of the first expected error and the second expected error may be corrected to a larger extent as the degree of turning of the traveling vehicle increases. Consequently, if the reliability of image target position information is reduced due to the turning of the vehicle, the image detection region is expanded more greatly, so that the accuracy of same target determination can be ensured.

The present disclosure has been described with reference to examples, but it is to be understood that the present disclosure is not limited to the examples and structures. The present disclosure covers various modifications and equivalent variations. In addition to various combinations and forms, other combinations and forms including one or more/less elements thereof are also within the spirit and scope of the present disclosure.

The invention claimed is:

1. A target detection device mounted in a vehicle, the target detection device comprising:
   a radar specification unit that specifies, as radar target position information, a radar detection point or a radar detection region of a radar detection target detected on the basis of detection information provided by a radar, the radar detection point being a detection point representing a position of the radar detection target relative to a base point of the vehicle on an XY-plane with an X-axis representing a vehicle width direction of the vehicle and a Y-axis representing a vehicle length direction of the vehicle, the radar detection region including the radar detection point;
   an image specification unit that specifies, as image target position information, an image detection region of an image detection target detected on the basis of a captured image provided by an imaging device, the image detection region being a region representing a position of the image detection target relative to the base point on the XY-plane; and a same target determination unit that determines that the radar detection target and the image detection target are the same target on condition that there is an overlapping part on the XY-plane between the position indicated by the radar target position information and the position indicated by the image target position information, wherein the image specification unit sets a Y-axis range as a Y-directional range of the image detection region on the XY-plane on the basis of a bearing from the base point to each of two X-directional ends of the image detection target in the captured image and of an expected width minimum value and an expected width maximum value as a minimum value and a maximum value of an X-directional width of an object expected to be detected as the target.

2. The target detection device according to claim 1, wherein the image specification unit:

calculates, as a Y-axis minimum value, a value on the Y-axis at which an X-directional width of a bearing range coincides with the expected width minimum value, the bearing range being determined on the basis of the bearings to the two X-directional ends of the image detection target in the captured image;

calculates, as a Y-axis maximum value, a value on the Y-axis at which the X-directional width of the bearing range coincides with the expected width maximum value; and sets the Y-axis range from the Y-axis minimum value to the Y-axis maximum value.

3. The target detection device according to claim 1, comprising an identification unit that identifies a type of the target, wherein the image specification unit changes the expected width minimum value and the expected width maximum value in accordance with the type of the target identified by the identification unit.

4. The target detection device according to claim 3, wherein the type of the target identified by the identification unit is a motorcycle, a passenger car, or a truck.

5. The target detection device according to claim 3, wherein the type of the target identified by the identification unit is a small-size vehicle, a medium-size vehicle, and a large-size vehicle.

6. The target detection device according to claim 1, wherein the same target determination unit expands the Y-axis range of the image detection region in both directions by a first expected error that is an expected margin of error, and performs same target determination on the basis of the image detection region expanded and the position indicated by the radar target position information.

7. The target detection device according to claim 1, wherein the image specification unit constructs the image detection region in the bearing range determined on the basis of the bearings from the two X-directional ends of the image detection target to the base point.

8. The target detection device according to claim 7, wherein the same target determination unit expands an angular width of the bearing range in which the image detection region is constructed in both directions by a second expected error that is an expected margin of error, and performs same target determination on the basis of the image detection region expanded and the position indicated by the radar target position information.

9. The target detection device according to claim 1, wherein the imaging device is a monocular camera.

10. A target detection device mounted in a vehicle, the target detection device comprising:

a radar specification unit that specifies, as radar target position information, a radar detection point or a radar detection region of a radar detection target detected on the basis of detection information provided by a radar, the radar detection point being a detection point representing a position of the radar detection target relative to a base point of the vehicle on an XY-plane with an X-axis representing a vehicle width direction of the vehicle and a Y-axis representing a vehicle length direction of the vehicle, the radar detection region including the radar detection point;

an image specification unit that specifies, as image target position information, an image detection region of an image detection target detected on the basis of a captured image provided by an imaging device, the image detection region being a region representing a position of the image detection target relative to the base point on the XY-plane; and a same target determination unit that determines that the radar detection target and the image detection target are the same target on condition that there is an overlapping part on the XY-plane between the position indicated by the radar target position information and the position indicated by the image target position information, wherein the image specification unit constructs the image detection region in a bearing range determined on the basis of bearings from two X-directional ends of the image detection target to the base point in the captured image, and the same target determination unit expands an angular width of the bearing range in which the image detection region is constructed in both directions by a second expected error that is an expected margin of error, and performs same target determination on the basis of the image detection region expanded and the position indicated by the radar target position information.

11. A target detection device mounted in a vehicle, the target detection device comprising:

one or more processors; and memory storing computer-executable instructions that, in response to being executed by the one or more processors, cause performance of operations, the operations comprising:

specifying, as radar target position information, a radar detection point or a radar detection region of a radar detection target detected on the basis of detection information provided by a radar, the radar detection point being a detection point representing a position of the radar detection target relative to a base point of the vehicle on an XY-plane with an X-axis representing a vehicle width direction of the vehicle and a Y-axis representing a vehicle length direction of the vehicle, the radar detection region including the radar detection point;

specifying, as image target position information, an image detection region of an image detection target detected on the basis of a captured image provided by an imaging device, the image detection region being a region representing a position of the image detection target relative to the base point on the XY-plane;

determining that the radar detection target and the image detection target are the same target on condition that there is an overlapping part on the XY-plane between the position indicated by the radar target position information and the position indicated by the image target position information; and setting a Y-axis range as a Y-directional range of the image detection region on the XY-plane on the basis of a bearing from the base point to each of two X-directional ends of the image detection target in the captured image and of an expected width minimum value and an expected width maximum value as a minimum value and a maximum value of an X-directional width of an object expected to be detected as the target.

12. A target detection device mounted in a vehicle, the target detection device comprising:

one or more processors; and memory storing computer-executable instructions that, in response to being executed by the one or more processors, cause performance of operations, the operations comprising:

specifying, as radar target position information, a radar detection point or a radar detection region of a radar detection target detected on the basis of detection information provided by a radar, the radar detection point being a detection point representing a position of the radar detection target relative to a base point of the vehicle on an XY-plane with an X-axis representing a vehicle width direction of the vehicle and a Y-axis representing a vehicle length direction of the vehicle, the radar detection region including the radar detection point;

specifying, as image target position information, an image detection region of an image detection target detected on the basis of a captured image provided by an imaging device, the image detection region being a region representing a position of the image detection target relative to the base point on the XY-plane; and determining that the radar detection target and the image detection target are the same target on condition that there is an overlapping part on the XY-plane between the position indicated by the radar target position information and the position indicated by the image target position information, wherein constructing the image detection region in a bearing range determined on the basis of bearings from two X-directional ends of the image detection target to the base point in the captured image, and expanding an angular width of the bearing range in which the image detection region is constructed in both directions by a second expected error that is an expected margin of error, and performs same target determination on the basis of the image detection region expanded and the position indicated by the radar target position information.

* * * * *